United States Patent
Guerin et al.

(10) Patent No.: US 9,938,856 B2
(45) Date of Patent: Apr. 10, 2018

(54) TOOL FOR FITTING AN INNER BEARING RACE CARRYING A BEARING CAGE AND SCREWS FOR RETAINING IN A TURBOMACHINE

(71) Applicant: SNECMA, Paris (FR)

(72) Inventors: Jacques Georges Philippe Guerin, Moissy-Cramayel (FR); Mathieu Pigeon, Moissy-Cramayel (FR)

(73) Assignee: SNECMA, Paris (FR)

( * ) Notice: Subject to any disclaimer, the term of this patent is extended or adjusted under 35 U.S.C. 154(b) by 318 days.

(21) Appl. No.: 14/770,007

(22) PCT Filed: Feb. 26, 2014

(86) PCT No.: PCT/FR2014/050411
§ 371 (c)(1),
(2) Date: Aug. 24, 2015

(87) PCT Pub. No.: WO2014/131989
PCT Pub. Date: Sep. 4, 2014

(65) Prior Publication Data
US 2016/0024967 A1    Jan. 28, 2016

(30) Foreign Application Priority Data

Feb. 28, 2013 (FR) .................................... 13 51820

(51) Int. Cl.
*F01D 25/16* (2006.01)
*B25B 7/06* (2006.01)
(Continued)

(52) U.S. Cl.
CPC ................ *F01D 25/16* (2013.01); *B25B 7/06* (2013.01); *B25B 27/06* (2013.01); *F16C 41/04* (2013.01);
(Continued)

(58) Field of Classification Search
CPC ....... F01D 25/16; F01D 25/285; B25B 27/06; B25B 7/06; F16C 41/04; F05D 2230/68
See application file for complete search history.

(56) References Cited

U.S. PATENT DOCUMENTS

| 1,406,824 A | 2/1922 | Dennis |
| 2004/0187652 A1 | 9/2004 | Pyre |

FOREIGN PATENT DOCUMENTS

| EP | 1 462 220 A1 | 9/2004 |
| FR | 2 949 138 A1 | 2/2011 |

OTHER PUBLICATIONS

Written Opinion of the International Searching Authority dated May 22, 2014, issued in corresponding International Application No. PCT/FR2014/050411, filed Feb. 26, 2014, 8 pages.
(Continued)

*Primary Examiner* — Moshe Wilensky
(74) *Attorney, Agent, or Firm* — Christensen O'Connor Johnson Kindness PLLC (57) ABSTRACT

The disclosure relates to a tool for fitting an inner bearing race carrying a bearing cage and rollers and screws in a turbomachine, comprising two sectored cylindrical casings which respectively cover an upstream end part of the race and the bearing cage, a cylindrical annulus which surrounds the second casing, and a locking ring which is fitted on an upstream part of the first casing and which has means for axially pressing against the annulus and for axially clamping the second casing between the annulus and the heads of the screws carried by the flange.

14 Claims, 7 Drawing Sheets

(51) Int. Cl.
*F16C 41/04* (2006.01)
*B25B 27/06* (2006.01)
*F01D 25/28* (2006.01)

(52) U.S. Cl.
CPC ........ *F01D 25/285* (2013.01); *F05D 2230/68* (2013.01)

(56) References Cited

OTHER PUBLICATIONS

International Preliminary Report on Patentability dated Sep. 1, 2015, issued in corresponding International Application No. PCT/FR2014/050411, filed Feb. 26, 2014, 1 page.
International Search Report dated May 22, 2014, issued in corresponding International Application No. PCT/FR2014/050411, filed Feb. 26, 2014, 2 pages.

TOOL FOR FITTING AN INNER BEARING RACE CARRYING A BEARING CAGE AND SCREWS FOR RETAINING IN A TURBOMACHINE

TECHNICAL FIELD

The present invention relates to a tool for mounting an assembly comprising an inner bearing race, a bearing cage and screws for holding in a turbine engine.

PRIOR ART

In the prior art, an assembly of the aforementioned type is mounted on a turbine-engine shaft by means of a dedicated tool. The inner bearing race of a turbine-engine bearing may comprise an upstream end part comprising outer annular wipers of a labyrinth seal, a middle part defining a race for rolling elements (balls, rollers, needles, etc.), in particular rollers, and a cage holding these rollers, and at its downstream end an outer annular flange for fixing to a turbine shaft of the turbine engine, this flange comprising an annular row of orifices for the passage of screws, the heads of which bear on the upstream annular face of the flange.

The tools of the prior art are not entirely satisfactory, in particular since they do not sufficiently or effectively protect the race, the cage and the bearing rollers, which may therefore be damaged during the use of the tool and the mounting of the race on the turbine-engine shaft, which may result in breakage of the bearing and premature dismantling of the engine. In addition, the tools currently used are relatively heavy, bulky and complex to use, and are not always designed to avoid human errors in faulty use.

Finally, a tool of the prior art is in general designed to mount a race on a single assembly configuration of the engine and another tool must be used to mount an identical race on another assembly configuration of the engine. It is for example the case of mounting an inner bearing race on a minor engine module, which is generally used in the workshop. The tool for mounting this race cannot be used to mount the same race on a major module of the engine, which represents the actual environment of the turbine engine in maintenance.

There is therefore a real need for a tool that affords a simple, effective and economical solution to at least some of the aforementioned problems.

DISCLOSURE OF THE INVENTION

The invention proposes a tool for mounting an assembly comprising an inner bearing race, a bearing cage equipped with rollers, and screws for holding in a turbine engine, the race comprising a raceway for the rollers and, at its downstream end, an outer annular flange comprising an orifice for the screws to pass, characterised in that it comprises a first sectored cylindrical envelope that is intended to cover an upstream end part of the race and comprises means for axial holding on the race, a second sectored cylindrical envelope that is intended to cover the cage and the rollers and at least one downstream end part of the first envelope and to come into axial abutment on the screw heads of the flange, a cylindrical ring that is intended to at least partly surround the second envelope and comprises means for downstream axial abutment on this second envelope, and a locking annulus that is mounted on an upstream end part of the first envelope, between the ring and axial retaining means of this first upstream part, and which comprises means for downstream axial abutment on the ring and axial clamping of the second envelope between the bearing means of the ring and the screw heads of the flange.

The tool according to the invention thus comprises two coaxial envelopes for covering and protecting (against impacts and contaminations for example) the upstream end part of the race, of the cage and of the bearing rollers, respectively, these envelopes being sectored in order to assist mounting/demounting thereof. The first envelope may be held axially on the race by cooperation of shapes and is held radially outwards by the second envelope. The second envelope is held radially outwards by the ring and is immobilised axially on the race while being clamped between the ring and the screw heads. The second envelope thus holds the screw heads in axial abutment on the upstream annular face of the flange of the race, which prevents them from moving during mounting operations (and in particular floating in the orifices of the flange). The second envelope surrounds the rollers of the cage, preferably with a radial clearance, so as to prevent any risk of contact with these rollers. The second envelope may comprise means for radial abutment towards the inside (with respect to the longitudinal axis of the tool and of the race) on the first envelope in order to hold it pressed against the race, and the ring may comprise means for radial abutment towards the inside of the second envelope in order to hold it pressed against the first envelope and the race. This ring is preferably in a single piece. The locking annulus is housed axially towards the upstream end by holding means for the first envelope. It comprises means for axial abutment on the ring and urging of the ring towards the downstream end so that the second envelope, on which the ring bears axially towards the downstream end, is clamped axially between the ring and the screw heads. This locking annulus is also preferably in a single piece.

The tool according to the invention does not have the drawbacks of the tools of the prior art. It is simple to use and relatively light (a few kilograms) and can easily be manipulated by an operator. It can be used in all types of mounting configuration on the engine, whether it is for example on a minor module or a major module. Finally, the tool according to the invention is not limited to one type of bearing and can be used for several types of inner bearing race.

Advantageously, the first envelope comprises, at its upstream end, claw teeth intended to engage with complementary claw teeth on the locking annulus so as firstly to allow axial mounting of the annulus on the upstream end part of the envelope and secondly to axially hold the annulus towards the upstream end when the annulus is rotated by a predetermined angle with respect to the first envelope.

The first envelope preferably comprises at least one resilient annular seal intended to cooperate with the second envelope. This seal in particular limits the relative movements between the first and second envelopes.

Preferably, the second envelope carries at its downstream end a resilient annular seal intended to come into abutment on the screw heads. This seal in particular makes it possible to compensate for the differences in height of the screw heads carried by the flange, the seal being constrained to a greater or lesser extent according to the heights of the screw heads.

In the aforementioned case where the inner bearing race comprises, on an upstream end part, outer annular wipers of a labyrinth seal, the tool preferably comprises a protective annulus intended to surround these wipers, this annulus being surrounded by the first envelope and being locked axially on the race by this first envelope.

The first envelope may comprise an annular groove oriented towards the upstream end for receiving a cylindrical rim oriented towards the downstream end of the second envelope. This rim and this groove form attachment means and cooperate together in order to radially hold the second envelope vis-à-vis the first envelope, before the ring is mounted on the second envelope.

The ring may comprise, at its upstream end, an internal annular rim intended to be interposed between the upstream end of the second envelope and the locking annulus.

The locking annulus preferably comprises threaded axial orifices for mounting screws, the free ends of which are intended to bear axially towards the downstream end on the ring, the tightening of the screws urging the ring downstream and causing the clamping of the second envelope between the ring and the screw heads.

The locking annulus preferably comprises means for gripping the tool, such as two handles diametrically opposed with respect to the longitudinal axis of the tool.

The tool may comprise a base for supporting the aforementioned assembly (race, cage and bearing rollers and holding screws) and for assembling the various parts of the tool, this base comprising an annular surface that is intended to serve as an abutment for the flange of the race and which comprises orifices for the screws of this flange to pass. The aforementioned assembly is intended to be disposed vertically on the base.

The present invention also concerns a method for mounting an assembly comprising an inner bearing race, a cage and bearing rollers and screws for holding in a turbine engine, by means of a tool as described above, characterised in that it comprises the steps consisting of:
  c) mounting the first-envelope sectors on the race,
  d) mounting the second-envelope sectors on the race and the first envelope,
  e) engaging the ring on the second envelope,
  f) engaging the locking annulus on the first envelope, for example by an axial translation towards the first envelope and then a rotation by a predetermined angle about the longitudinal axis of the tool,
  g) axially clamping the second envelope between the ring and the screw heads,
  j) engaging the tool and the race on a turbine-engine shaft by axial translation from the upstream end until it comes into axial abutment on an annular surface of this shaft and so that the screws carried by the race flange pass through the orifices in this surface,
  k) screwing nuts onto the free ends of the screws, and
  l) removing the tool.

The method may comprise one or more of the following additional steps:
  before step c):
  a) placing the aforementioned assembly vertically on the supporting base, so that the screws of the flange pass through the orifices in the base,
  b) engaging the protective annulus on the wipers of the race,
  between steps g) and j):
  h) heating the aforementioned assembly, either by putting the race and the tool and its base in an oven, or by induction by means of an element that passes axially through the tool and the race and passes through a central orifice in the base,
  i) removing the tool from its base.

Finally, the present invention relates to a kit for implementing the method as described above, characterised in that it comprises a case for arranging and storing the sectors of the first and second envelopes, the ring, the locking annulus, and optionally the protective annulus, the supporting base and a tool for individual dismantling of the second-envelope sectors.

DESCRIPTION OF THE FIGURES

The invention will be better understood and other details, features and advantages of the invention will emerge from a reading of the following description given by way of non-limitative example and with reference to the accompanying drawings, in which.

DETAILED DESCRIPTION

Figure 1:
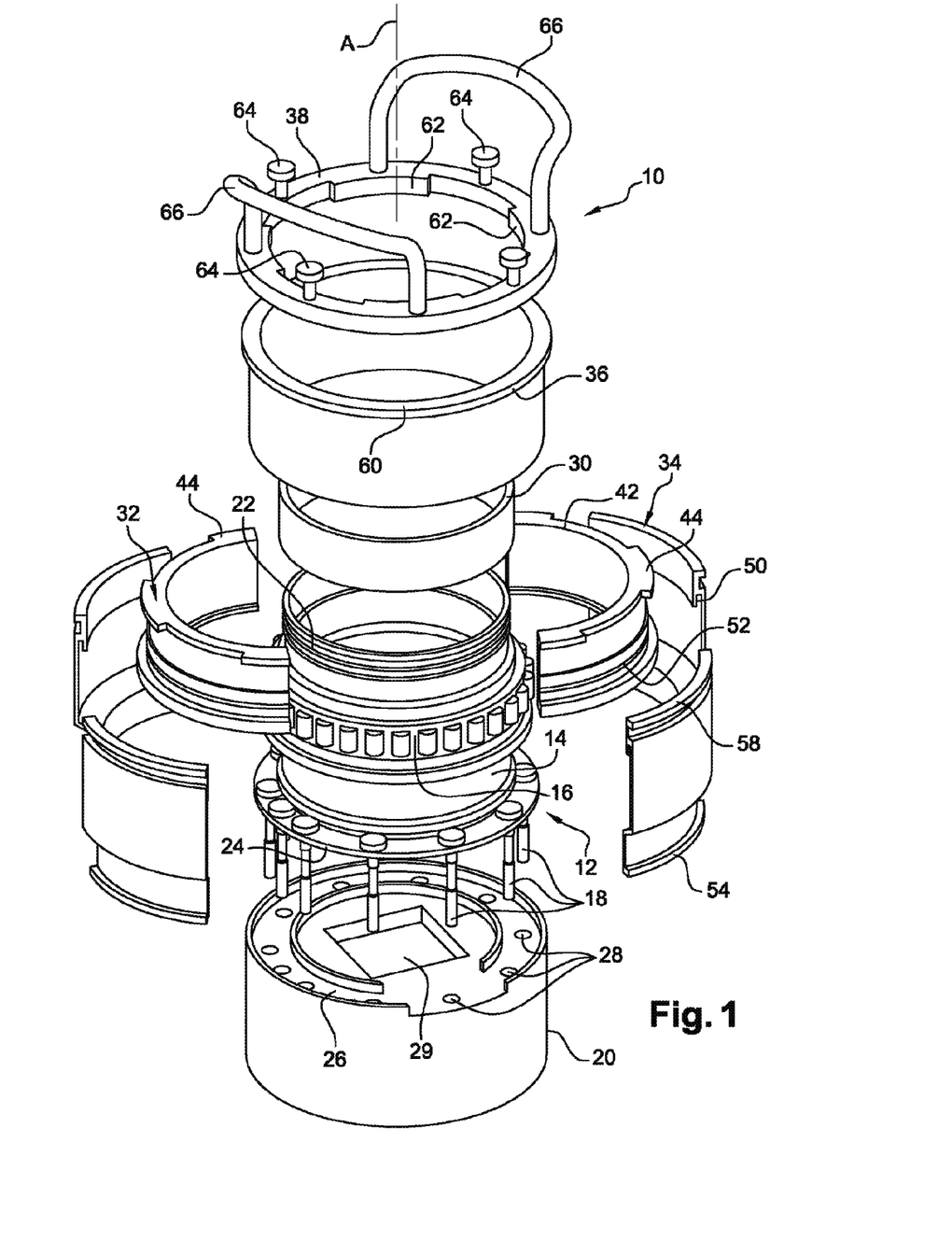
FIG. 1 is a schematic view in exploded perspective of a tool according to the invention for mounting an inner bearing race carrying a bearing-roller cage and holding screws.

Reference is made first of all to FIG. 1, which depicts a tool 10 according to the invention for mounting an assembly 12 comprising an inner bearing race 14, a bearing cage 16 and screws 18, on a minor or major turbine-engine shaft module, this tool 10 comprising a plurality of parts, the function of which is in particular to protect the race 14 and the bearing cage 16 during mounting and which are assembled on a supporting base 20.

In the following description, the terms "upstream" and "downstream" are used with reference to the flow of gases in the turbine engine. In the position of mounting in the turbine engine, the race 14 comprises an upstream end situated towards the upstream end of the turbine engine and a downstream end situated towards the downstream end of the turbine engine. The same terms are used to designate ends of the parts of the tool. In other words, an upstream end of a part of the tool will be situated towards the upstream end of the bearing race 14, and vice-versa.

The bearing race 14 has a substantially cylindrical shape with a longitudinal axis A. The expressions "radially inner" and "radially outer" are used hereinafter to designate the radial positions with respect to the axis A.

The bearing race 14 comprises outer annular wipers 22 on its upstream end part, a raceway on its middle part and an outer annular flange 24 at its downstream end. The wipers 22 are intended to be surrounded by and cooperate with a part of the stator of the turbine engine in order to form a labyrinth seal. The bearing cage 16 is engaged on the raceway of the race 14, which comprises means for axial holding of this cage in this raceway. The annular flange 24 comprises an annular row of axial orifices for passage of the screws 18, which are eleven in number in the example depicted. The screws 18 are in general engaged with clearance in these orifices. The assembly 12 formed by the race 14, the bearing cage 16 and the screws 18 is intended to be mounted on a turbine shaft of the turbine engine, by means of a single tool 10.

As will be described hereinafter, the supporting base 20 is designed so as to receive the assembly 12 in the vertical position, that is to say, when the tool is assembled, the longitudinal axis A of the race 14 and of the tool 10 is oriented vertically. This base 20 has a cylindrical shape, its bottom end being intended to be in abutment on a flat surface and its top end comprising an annular groove 26 for receiving the flange 24 of the race 14. This groove 26 is delimited by two coaxial cylindrical rims that form means for centring the race 14 on the base, the bottom of the groove 26 comprising an annular row of orifices 28 for passage of the screws 18 carried by the race 14. These orifices 28 are distributed on the bottom of the groove 26 in the same way as the orifices of the flange 24. They preferably have a diameter slightly greater than that of the screws 18 in order to limit their movement. The base 20 further comprises a central orifice 29 with a square cross-section for passage of means (not shown) for heating the race 14 by induction, these heating means being intended to pass axially through the race 14, the tool 10 and the base 20. The supporting base is for example produced from aluminium alloy.

Figure 11:
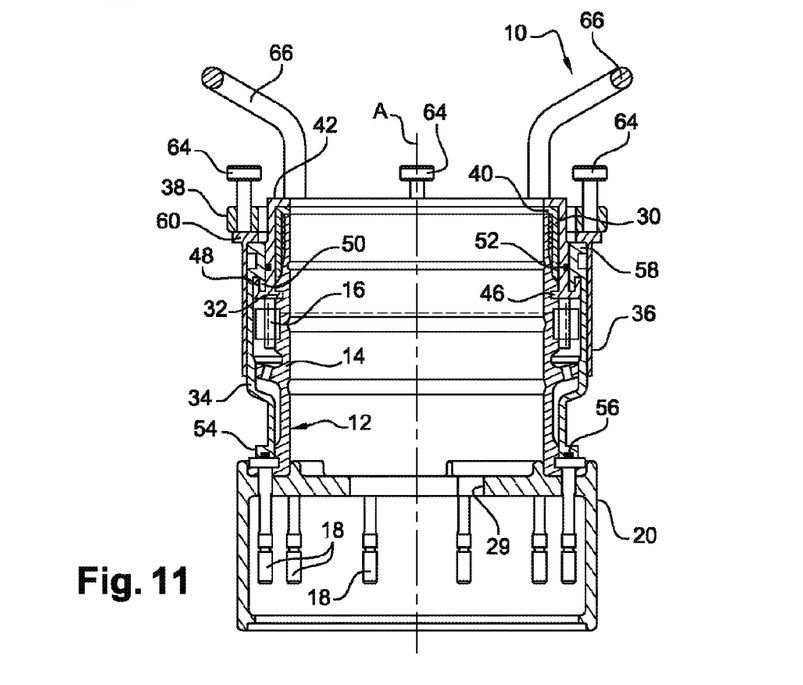
FIG. 11 is a schematic view in axial cross-section of the tool of FIG. 1.

In the example shown, the tool 10 comprises five annular parts coaxial with each other and with the race 14, at least some of these parts extending some around the others in the mounting position, as can be seen in FIG. 11. The tool 10 comprises a protective annulus 30, a first sectored envelope 32, a second sectored envelope 34, a ring 36 and a locking annulus 38.

The protective annulus 30 is intended to surround the upstream end part of the race 14 and to protect the wipers 22 of the race. As can be seen in FIG. 11, this annulus 30 comprises, at its upstream (or top) end, an inner annular rim 40 that is intended to come into axial abutment on the upstream end of the race 14. This annulus 30 is formed in a single piece, for example from aluminium alloy.

The first envelope 32 has a cylindrical shape overall and is intended to surround the protective annulus 30. It comprises, at its upstream end, an inner annular rim 42 that extends upstream of the rim 40 of the annulus 30 and provides the axial holding of the annulus 30 on the race 14. It further comprises, at its upstream end, an annular row of claw teeth 44 that extend radially towards the outside. These teeth 44 are four in number and are regularly distributed around the axis A. They each have an angular extent 45° and are separated from one another by inter-tooth circumferential spaces each having an angular extent of 45° around the axis A. These teeth 44 are visible in FIG. 1 but not in FIG. 11 since the cross-section has been produced at the aforementioned inter-tooth spaces.

The envelope 32 comprises at its downstream end an inner annular rim 46 that is intended to be housed in an annular outer groove with a complementary shape in the race 14, this groove being situated directly upstream of the bearing cage 16. The first envelope 32 therefore extends axially over the end part of the race 14 situated upstream of the bearing cage. As can be seen in FIG. 11, the envelope 32 has a diameter close to that of the bearing cage 16.

The envelope 32 further comprises at its downstream end a cylindrical rim 48 oriented upstream and which forms a channel or annular groove for receiving and attaching a cylindrical rim 50 oriented towards the downstream end of the second envelope 34. The first envelope 32 further comprises on its outer surface an annular groove for receiving a resilient seal 52 that is intended to cooperate with an inner surface of the second envelope 34. This seal 52 can be mounted captive in the groove of the envelope 32.

The envelope 32 is sectored and formed by sectors intended to be disposed circumferentially end to end. In the example depicted, the envelope 32 comprises two sectors, each sector comprising a complete claw tooth 44 and two half-teeth 44 situated at the circumferential ends of the sector. Each sector further comprises one half of the aforementioned seal 52.

The second envelope 34 has a cylindrical shape overall and is intended to surround in particular the bearing cage 16 and the downstream end part of the first envelope 32. The envelope 34 surrounds the bearing cage 16 with a radial clearance (for example around 1.5 mm) in order to prevent any contact between the bearings and inner surface of the envelope 34.

The envelope 34 comprises at its downstream (or bottom) end an outer annular rim 54 that extends upstream of the heads of the screws 18 and comprises, on its downstream annular face, an annular groove for receiving a resilient seal 56 intended to bear axially on the heads of the screws 18. This seal 56 can be mounted captive in the groove of the envelope 34. The envelope 34 can bear radially towards the inside on one or more annular surfaces of the race 14. The envelope 34 comprises at its upstream end an outer annular rim 58 for axial abutment of the ring 36.

The envelope 34 is sectored and formed by sectors intended to be disposed circumferentially end to end. In the example depicted, the envelope 34 comprises five sectors, each sector comprising a sector of the aforementioned seal 56.

The envelopes 32 and 34 are for example produced from steel.

The ring 36 has a cylindrical shape overall and is intended to surround the upstream end part of the second envelope 34. It comprises at its upstream (or top) end a radial protrusion formed by respectively inner and outer annular rims, the inner rim 60 extending upstream of the rim 58 of the second envelope 34 and being intended to come into axial abutment on this rim 58.

The ring 36 is formed of a single piece, for example made from steel.

The locking annulus 38 comprises an annular row of claw teeth 62 that extend radially inwards. These teeth 62 are four in number and are regularly distributed around the axis A. They each have an annular extent of 45° and are separated from one another by inter-tooth circumferential spaces each having an angular extent of 45° around the axis A. These teeth 62 are visible in FIG. 1 but not in FIG. 11 since the cross-section has been made at the aforementioned inter-tooth spaces. The teeth 44 and 62 of the envelope 32 and of the locking annulus 38 are intended to cooperate with each other for the mounting of the annulus 38 on the envelope 32 by claw coupling.

The annulus 38 is intended to be mounted on the upstream end part of the envelope 32 and to be interposed axially between the claw teeth 44 of the envelope 32, situated upstream, and the upstream end of the ring 36, situated downstream.

The annulus 38 comprises an annular row of threaded through orifices for screwing screws 64 from the upstream end, the free ends of these screws 64 being intended to bear axially on the upstream end of the ring 36 in order to urge it downstream and thus to clamp the second envelope 34 between the ring and the heads of the screws 18.

The annulus 38 further comprises handles 66 for gripping and manipulating the tool 10, these handles here being two in number, connected to the upstream end of the annulus and diametrically opposite with respect to the axis A.

The assembly of the tool 10 on the bearing race 14 will now be described with reference to FIGS. 2 to 10.

Figure 2:
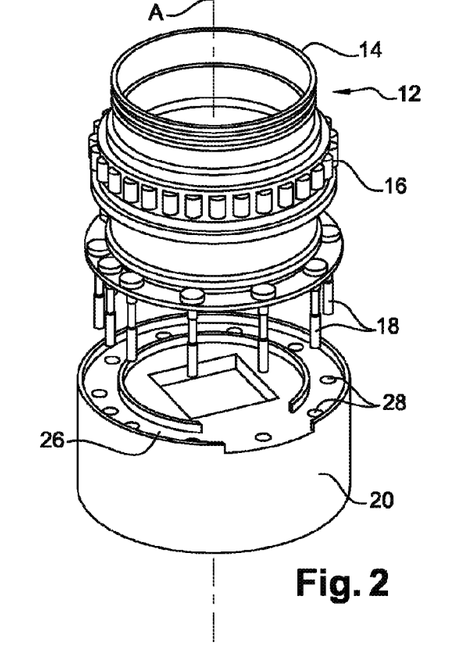
FIGS. 2 to 10 are schematic perspective views of the tool of FIG. 1 and depicts steps of assembling this tool.
Figure 3:
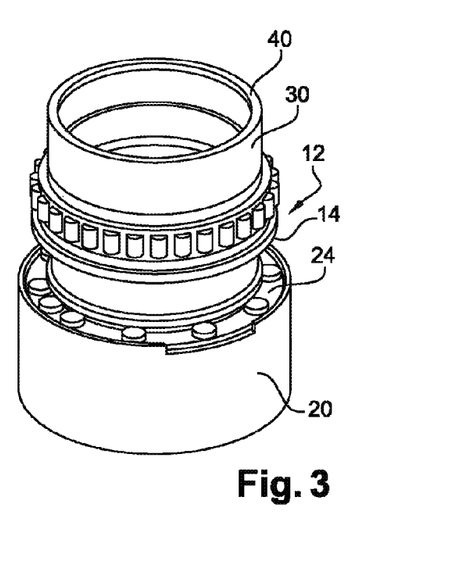

A first step of the assembly method consists of placing the aforementioned assembly 12 (race 14, cage and bearing rollers 16 and screw 18) on the supporting base 20. For this purpose, the assembly 12 is positioned coaxially above the base 20 disposed horizontally, so that the screws 18 carried by the flange are aligned with the orifices 28 in the base 20 (FIG. 2). The assembly 12 is then moved in translation along the axis A towards the base 20 until the screws 18 pass into the orifices 28 in the base and the flange 24 engages in the groove 26 in the base and bears on its bottom.

The protective annulus 30 is then engaged on the wipers of the race 14 (FIG. 3) by translation of the ring downwards, until its rim 40 bears on the upstream or top end of the race.

Figure 4:
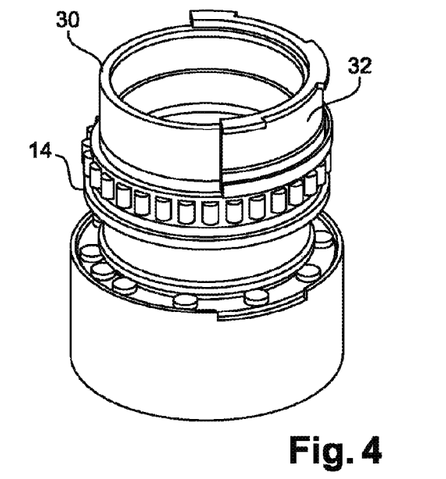
Figure 5:
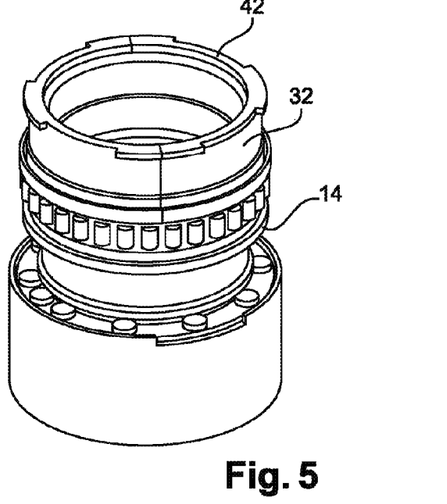

The sectors of the first envelope 32 are next mounted one after the other on the protective annulus 30 and the race 14 (FIGS. 4 and 5). For this purpose, each sector is positioned radially outside the annulus 30 and is moved in radial translation towards the annulus until its rim 46 (not visible in FIGS. 4 and 5) engages in the corresponding groove in the race 14. The envelope 32 holds the annulus 30 axially on the race by means of its rim 42, and is itself held axially on the race by cooperation of its rim 46 with the race 14.

Figure 6:
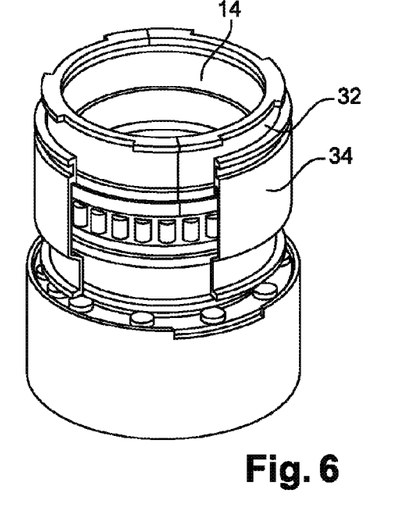
Figure 7:
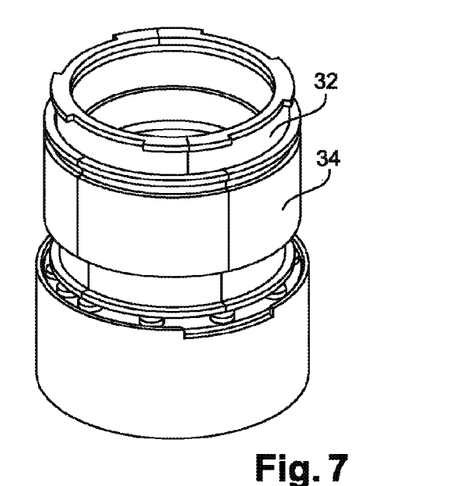
Figure 8:
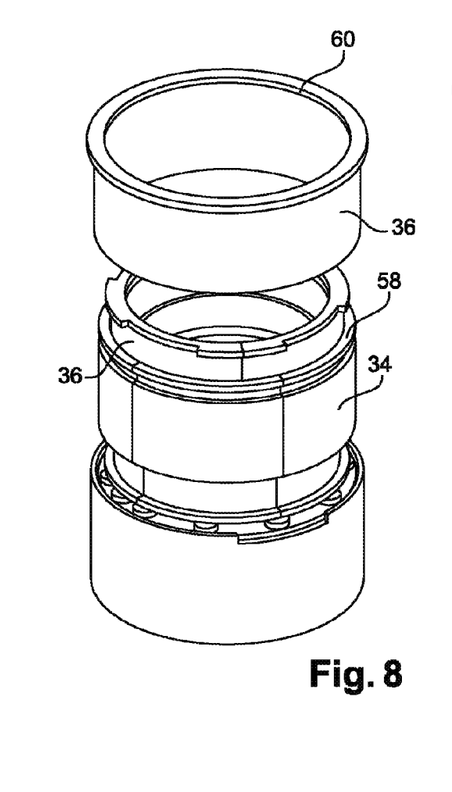

The sectors of the second envelope 34 are next mounted one after the other on the first envelope 32 and the race 14 (FIGS. 6 to 7). For this purpose, each envelope sector 34 is disposed radially outside the first envelope 32 so that the rim 50 of the envelope 34 is situated upstream of the rim 48 of the envelope 32. The envelope 34 is then moved in radial translation inwards until it comes into radial abutment on the envelope 32 and is then moved in axial translation downstream so that its rim 50 engages in the groove defined by the rim 48 of the envelope 32. The lengths or axial dimensions of the rims 48, 50 are designed so that they do not prevent the axial abutment of the seal 56 of the envelope 34 on the screw heads 18. More precisely, the length of the rim 50 of the envelope 34 is less than the depth or axial dimension of the groove defined by the rim 48 of the envelope 32 so that on mounting an axial clearance remains between the free end of the rim and the bottom of the groove. Likewise, the length of the rim 48 and the envelope 32 is less than the depth or axial dimension of the groove defined by the rim 50 of the envelope 34 so that on mounting an axial clearance remains between the free end of this rim and the bottom of this groove. These clearances enable the envelope 34 to be clamped between the ring 36 and the screw heads 18. Because of the manufacturing tolerances, the upstream or top surfaces of the screw heads 18 are not all necessarily coplanar. The tool 10 makes it possible to overcome this drawback by means of the seal 56, which is intended to come into abutment on the screw heads and to compensate for the differences in axial positions of these heads, the seal being compressed to a greater or lesser extent according to these axial positions, which vary over a few tenths of a millimeter for example (IT=0.4 mm).

The ring 36 is next engaged on the second envelope 34 by axial translation downwards (FIG. 8), until its rim 60 bears axially on the rim 58 of the second envelope 34.

Figure 9:
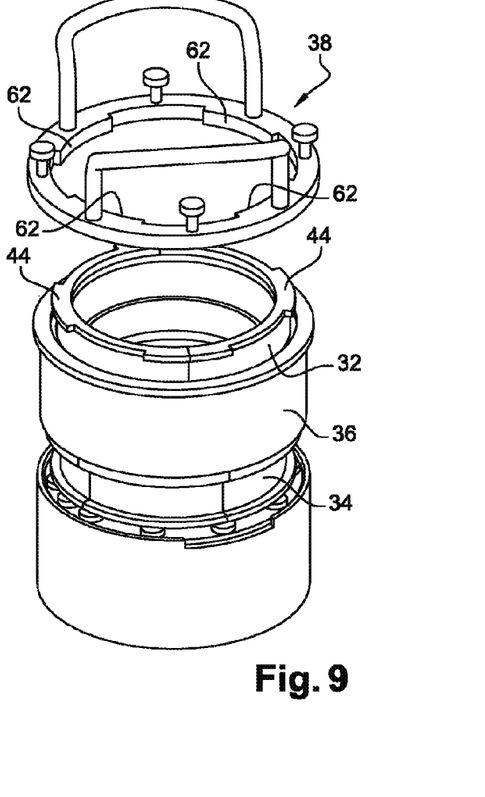
Figure 10:
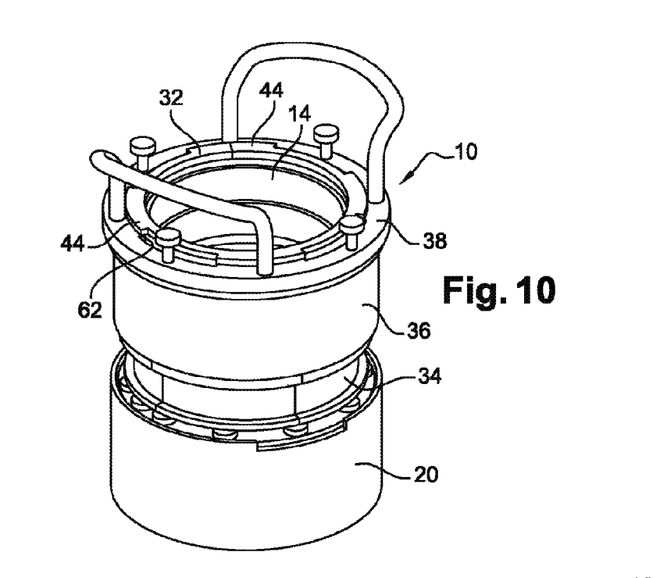

The locking annulus 38 is next mounted by claw coupling on the upstream end part of the first envelope 32 (FIGS. 9 and 10). For this purpose, the annulus 38 is positioned coaxially above the first envelope 32 so that its claw teeth 62 are aligned axially with the inter-tooth spaces of the envelope 32 (FIG. 9). The annulus 38 is next moved by axial translation downwards until it comes into abutment on the upstream end of the ring 36. The teeth 62 of the annulus 38 are then situated downstream of the teeth 44 of the envelope 32. The annulus is next rotated about the axis A by an angle of 45° so that the teeth 44, 62 are aligned axially (FIG. 10). The annulus 38 is then held axially upwards by the teeth 44 of the envelope 32, which extend upstream of the teeth 62 of the annulus.

The screws 64 are screwed, preferably manually, so that their free ends bear on the ring 36 and urge it downstream. This will cause the annulus 38 to be put in axial abutment on the claw teeth 44 of the envelope 32 and moreover cause the envelope 34 to be clamped axially between the ring 36 and the screw heads 18, which will be prevented from moving when the tool is manipulated.

The tool 10 makes it possible to distribute the reverse forces of the pressing of the screws 18 in the groove of the race that receives the rim 46 of the first envelope, without any risk of hammering or scratching the surfaces of the groove and of the bearing cage.

Figure 12:
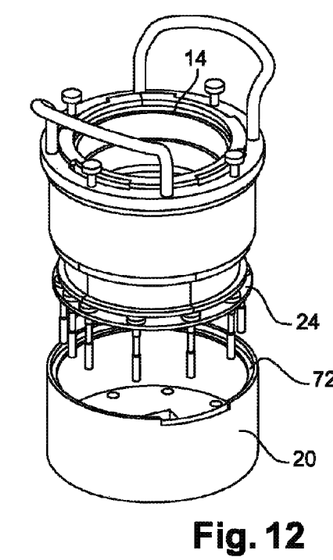
FIG. 12 is another schematic view in perspective of the tool according to the invention and depicts a variant embodiment of the supporting base.

Before it is mounted on a turbine-engine shaft, the assembly 12 may be heated. The base 20 shown in FIGS. 1 to 11 comprises a central orifice for induction heating means to pass, as described above. In the variant embodiment in FIG. 12, this same base 20 (but turned over) is used to heat the assembly 12, this base being intended to be introduced into an oven with the assembly 12 and the tool 10. This base 20 has the overall form of a cylindrical bowl, the base of the bowl being intended to be in abutment on a flat surface and the top periphery of the bowl comprising a cylindrical surface 72 for abutment of the flange 24 of the race 14.

Figure 13:
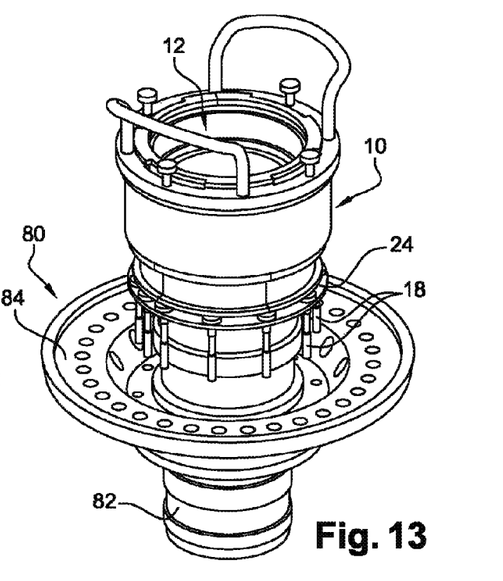
FIGS. 13 and 14 are schematic perspective views of the tool of FIG. 1 and a minor turbine-shaft module of a turbine engine, and depicts steps of mounting the inner bearing race on this module.
Figure 14:
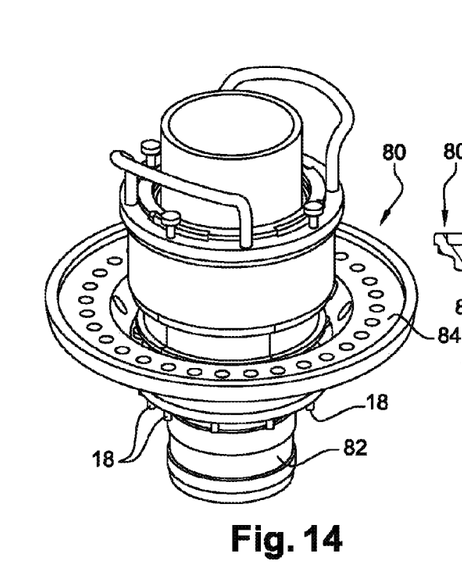
Figure 15:
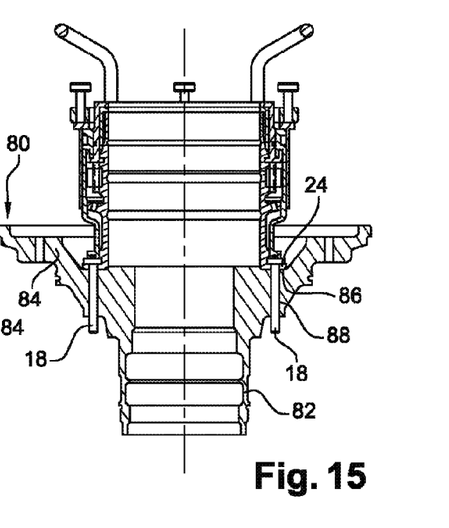
FIG. 15 is a schematic view in axial cross-section of the tool and shaft of FIGS. 13 and 14, FIGS. 16 to 22 are schematic perspective views of the tool of FIG. 1 and a major turbine-shaft module of a turbine engine, and depict steps of mounting the inner bearing race on this module and of removing the tool.

FIGS. 13 to 15 are now referred to, which depict steps of mounting the assembly 12 on a minor module 80 of a turbine shaft of a turbine engine. This minor module 80 can be used in particular in a workshop. It comprises a cylindrical part 82 that is connected substantially at its middle to a substantially frustoconical part 84 comprising an annular surface 86 oriented upstream and on which the upstream ends of axial orifices 88 for mounting the screws 18 of the assembly 12 emerge.

A first step depicted in FIG. 13 consists of coaxially positioning the tool 10 upstream of the module (which is in general placed so that its longitudinal axis is oriented horizontally, so that the screws 18 are aligned axially with the orifices 88 in the module 80. The tool 10 is next moved by axial translation towards the module until the screws 18 engage in the orifices 88 in the module and the flange 24 of the race bears on the annular surface 86 of the module (FIGS. 14 and 15). Nuts are then screwed onto the threaded rods of the screws 18 and are tightened against the module. The tool 10 can then be disassembled, as will be described in more detail hereinafter.

Figures 16, 17, 18, 19:
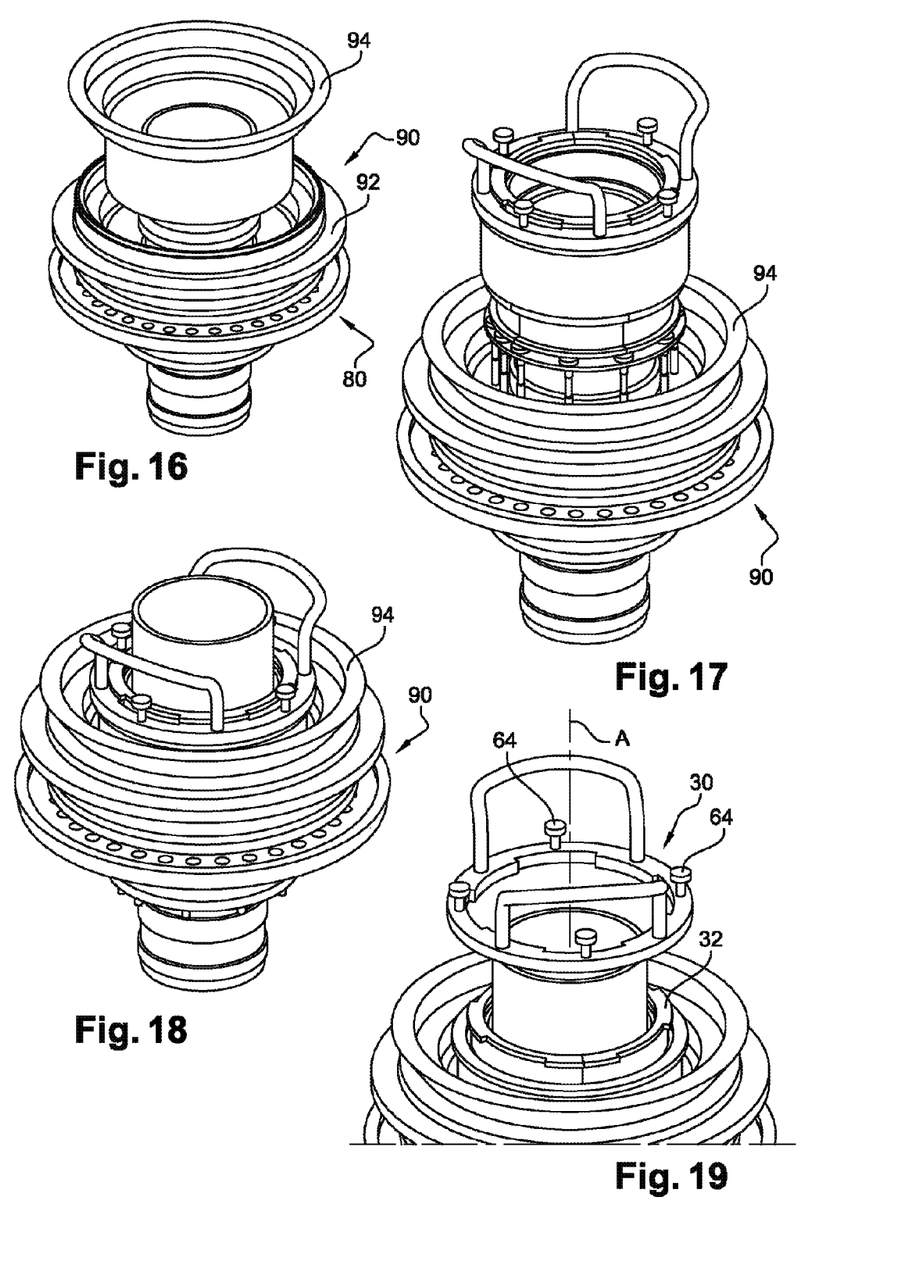
Figure 20:
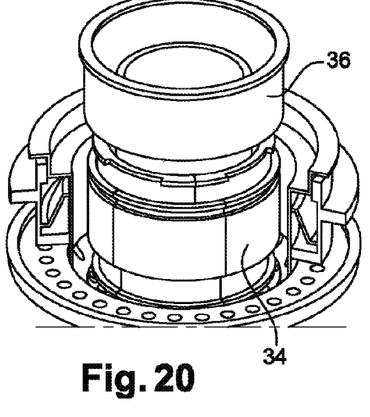
Figure 21:
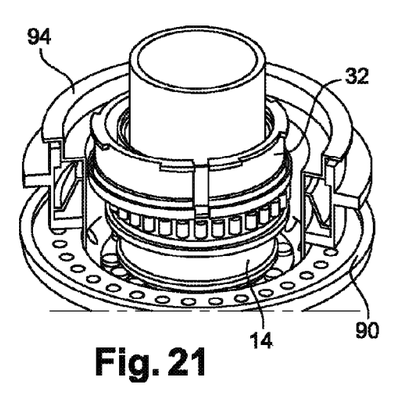

FIGS. 16 to 18 depict steps of mounting the assembly 12 on a major module 90 of a turbine shaft of a turbine engine, this major module 80 representing the actual environment of the turbine engine under repair conditions. The major module 80 comprises a minor module as described above, at the upstream end of which annular parts 92 are fixed. These parts 92 comprise in particular inner annular wipers (not visible) that must be protected during the operation of mounting the assembly 12 on the module 90. For this purpose, a removable annular protective member 94 is engaged in the parts 92, this member covering the aforementioned wipers but not interfering with the mounting of the assembly 12 on the module 90.

The steps of mounting the assembly 12 on the major module 90 by means of the tool 10 (FIGS. 17 and 18) are the same as those described above with reference to FIGS. 13 to 15, FIGS. 19 to 22 show steps of disassembling or demounting the tool.

Figure 22:
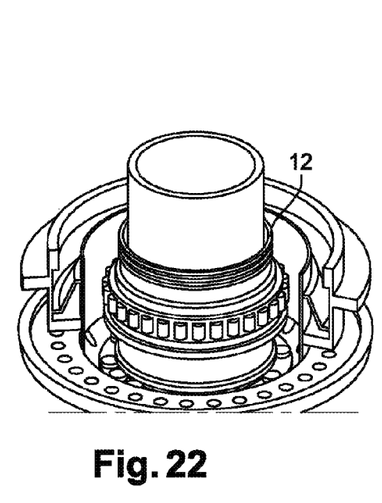

In FIG. 19, the screws 64 of the locking annulus 38 have been unscrewed and the annulus has been rotated by 45° about the axis A, so as to be able to remove it from the envelope 32 by axial translation upstream. The ring 36 is next removed by axial translation upstream (FIG. 20) and the sectors of the second envelope 34 are removed one after the other. The sectors of the first envelope 32 are removed one after the other (FIG. 21) and then the protective annulus 30 is removed by axial translation upstream. The protective member 94 is then removed by axial translation upstream (FIG. 22). At least some of the steps of removing the parts of the tool 10 and of the member 94 can be performed by means of another tool such as pliers.

Figure 23:
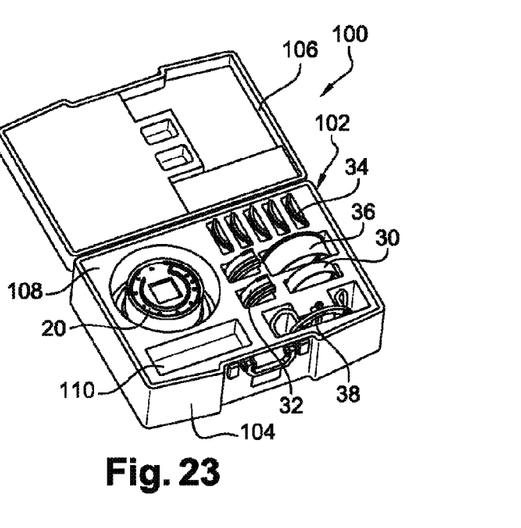
FIG. 23 is a schematic perspective view of a kit according to the invention.

FIG. 23 shows a kit 100 for implementing the aforementioned steps. This kit 100 comprises a case 102 for arranging and storing the various parts of the tool 10 described above. The case 102 comprises a box 104 and a lid 106 closing the box, the box comprising a foam block 108 comprising hollowed-out parts forming chambers for housing the various parts of the tool. The block 108 defines a chamber for housing the supporting base 20, a housing chamber for each sector of the second envelope 34, a housing chamber for each sector of the first envelope, a chamber housing the ring, a chamber housing the protective annulus 30, a chamber housing the locking annulus 38 and a chamber 110 housing pliers (not shown) for disassembling the tool 10.

The invention claimed is:

1. A tool for mounting an assembly comprising an inner bearing race, a bearing cage equipped with rollers, and screws for holding in a turbine engine, the race comprising a raceway for the rollers and, at its downstream end, an outer annular flange comprising orifices for the screws to pass, said tool comprising a first sectored cylindrical envelope configured to cover an upstream end part of the race and comprising means for axial holding on the race, a second sectored cylindrical envelope configured to cover the bearing cage and at least one downstream end part of the first envelope and to come into axial abutment on the screw heads of the flange, a cylindrical ring configured to at least partly surround the second envelope and comprising means for downstream axial abutment on this second envelope, and a locking annulus that is mounted on an upstream end part of the first envelope, between the ring and axial retaining means of this upstream end part, and which comprises means for downstream axial abutment on the ring and axial clamping of the second envelope between the bearing means of the ring and the screw heads of the flange.

2. The tool according to claim 1, wherein the first envelope comprises, at its upstream end, claw teeth configured to engage with complementary claw teeth on the locking annulus so as firstly to allow axial mounting of the annulus on the upstream end part of the envelope and secondly to axially hold the annulus towards the upstream end when the annulus is rotated by a predetermined angle with respect to the first envelope.

3. The tool according to claim 1, wherein the first envelope comprises at least one resilient seal configured to cooperate with the second envelope, and/or the second envelope carries at its downstream end a resilient annular seal configured to come into abutment on the screw heads.

4. The tool according to claim 1, wherein the inner bearing race comprises, on an upstream end part, outer annular wipers of a labyrinth seal, the tool further comprises a protective annulus configured to surround these wipers, this annulus being surrounded by the first envelope and being locked axially on the race by this first envelope.

5. The tool according to claim 1, wherein the first envelope comprises an upstream-oriented annular groove configured for receiving a downstream-oriented cylindrical rim of the second envelope.

6. The tool according to claim 1, wherein the ring comprises at its upstream end an inner annular rim configured to be interposed between the upstream end of the second envelope and the locking annulus.

7. The tool according to claim 1, wherein the locking annulus comprises threaded axial orifices configured for mounting screws, the free ends of which are configured to bear axially towards the downstream end on the ring, the clamping of the screws urging the ring downstream and causing the clamping of the second envelope between the ring and the screw heads.

8. The tool according to claim 1, which comprises a base configured for supporting the aforementioned assembly and for assembling the various parts of the tool, this base comprising an annular surface that is configured to serve as an abutment for the flange of the race and which comprises orifices for the screws of this flange to pass.

9. A method for mounting an assembly comprising an inner bearing race, a cage, and bearing rollers and screws for holding in a turbine engine, by means of a tool according to claim 1, said method comprising:
mounting the first-envelope sectors on the race;
mounting the second-envelope sectors on the race and the first envelope;
engaging the ring on the second envelope;
engaging the locking annulus on the first envelope;
axially clamping the second envelope between the ring and the screw heads;
engaging the tool and the race on a turbine-engine shaft by axial translation from the upstream end until it comes into axial abutment on an annular surface of this shaft and so that the screws carried by the race flange pass through the orifices in this surface;
screwing nuts onto the free ends of the screws;
removing the tool.

10. The tool according to claim 7, wherein the locking annulus includes means for gripping the tool.

11. The tool according to claim 7, wherein said means for gripping the tool includes two handles diametrically opposed with respect to the longitudinal axis of the tool.

12. The method according to claim 9, wherein said engaging the locking annulus on the first envelope includes axial translation towards the first envelope and then a rotation by a predetermined angle about the longitudinal axis of the tool.

13. The method according to claim 9, further comprising, before said mounting the first-envelope sectors on the race,
placing the aforementioned assembly vertically on the supporting base so that the screws of the flange pass through the orifices in the base; and
engaging the protective annulus on the wipers of the race.

14. The method according to claim 9, further comprising, after axially clamping the second envelope between the ring and the screw heads, heating the aforementioned assembly, either by putting the race and the tool and its base in an oven, or by induction by means of an element that passes axially through the tool and the race and passes through a central orifice in the base; and removing the tool from its base.

\* \* \* \* \*